(12) United States Patent
Merchant et al.

(10) Patent No.: US 11,988,142 B2
(45) Date of Patent: May 21, 2024

(54) INLET FILTER HOUSING HAVING COMPONENTS INCLUDING PORTIONS OF FILTER SYSTEM THAT COLLECTIVELY FORM HOUSING

(71) Applicant: General Electric Company, Schenectady, NY (US)

(72) Inventors: Laxmikant Merchant, Bengaluru (IN); Dinesh Venugopal Setty, Bangalore (IN); Mukesh Niddodi Kamath, Bangalore (IN); Prithviraj Pandian, Bangalore (IN)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/112,296

(22) Filed: Feb. 21, 2023

(65) Prior Publication Data
US 2023/0193825 A1    Jun. 22, 2023

Related U.S. Application Data

(63) Continuation of application No. 17/019,415, filed on Sep. 14, 2020, now abandoned.

(51) Int. Cl.
*F02C 7/05*    (2006.01)

(52) U.S. Cl.
CPC ............ *F02C 7/05* (2013.01); *F05D 2240/35* (2013.01); *F05D 2250/221* (2013.01); *F05D 2260/607* (2013.01)

(58) Field of Classification Search
CPC .. F02C 7/05; F05D 2240/35; F05D 2250/221; F05D 2260/607
See application file for complete search history.

(56) References Cited

U.S. PATENT DOCUMENTS

| | | |
|---|---|---|
| 8,046,896 B2 | 11/2011 | Schmitt et al. |
| 8,580,014 B1 | 11/2013 | Pike et al. |
| 8,726,609 B1 | 5/2014 | Laing et al. |
| 9,045,232 B1 | 6/2015 | Burke et al. |
| 9,546,596 B1 | 1/2017 | Zhang et al. |
| 9,759,089 B2 | 9/2017 | Weber et al. |
| 2010/0054919 A1 | 3/2010 | Hiner et al. |

(Continued)

FOREIGN PATENT DOCUMENTS

WO    2019137822 A2    7/2019

OTHER PUBLICATIONS

Final Office Action dated Oct. 20, 2022 for U.S. Appl. No. 17/019,415, filed Sep. 14, 2020; pp. 11.

(Continued)

*Primary Examiner* — Courtney D Heinle
*Assistant Examiner* — Theodore C Ribadeneyra
(74) *Attorney, Agent, or Firm* — Charlotte Wilson; James Pemrick; Hoffman Warnick LLC

(57) ABSTRACT

An inlet filter housing includes a plurality of components that collectively form a complete filtering and conditioning system for filtering and conditioning a fluid along a housing flow path. Each component is fitted within an external structure of an International Organization of Standards (ISO) shipping container, which provides a rectangular cuboid enclosure. Each component includes operative structure of at least one of: a) only a portion of an axial extent of the filtering and conditioning system, and b) only a portion of a lateral cross-sectional area of the housing flow path.

19 Claims, 6 Drawing Sheets

(56) References Cited

U.S. PATENT DOCUMENTS

| | | |
|---|---|---|
| 2011/0277628 A1 | 11/2011 | Pike et al. |
| 2012/0204568 A1 | 8/2012 | Jarrier |
| 2013/0087045 A1 | 4/2013 | Sullivan et al. |
| 2013/0087219 A1 | 4/2013 | Rajesh et al. |
| 2013/0111937 A1 | 5/2013 | Hendrix et al. |
| 2013/0232932 A1 | 9/2013 | Jarrier |
| 2013/0255359 A1 | 10/2013 | Smith et al. |
| 2014/0017068 A1 | 1/2014 | Herrera |
| 2014/0196437 A1 | 7/2014 | Schneider |
| 2014/0360371 A1 | 12/2014 | Seitz |
| 2015/0101344 A1 | 4/2015 | Jarrier et al. |
| 2015/0113938 A1 | 4/2015 | Kippel et al. |
| 2015/0114004 A1 | 4/2015 | Conger et al. |
| 2015/0219010 A1 | 8/2015 | Santini et al. |
| 2015/0240720 A1 | 8/2015 | Brunner |
| 2016/0090190 A1 | 3/2016 | Snyder et al. |
| 2017/0223904 A1 | 8/2017 | Raccanello |
| 2019/0120134 A1 | 4/2019 | Goleczka et al. |
| 2019/0314748 A1 | 10/2019 | Green et al. |

OTHER PUBLICATIONS

Office Action dated May 25, 2022 for U.S. Appl. No. 17/019,415, filed Sep. 14, 2020; pp. 15.

European Search Report dated Feb. 11, 2022 for Application 21193886.5; pp. 9.

INLET FILTER HOUSING HAVING COMPONENTS INCLUDING PORTIONS OF FILTER SYSTEM THAT COLLECTIVELY FORM HOUSING

TECHNICAL FIELD

The disclosure relates generally to power generation equipment and, more particularly, to an inlet filter housing including a plurality of components. Each component includes operative structure of at least one of: a) only a portion of an axial extent of the filtering and conditioning system, and b) only a portion of a lateral cross-sectional area of the housing flow path. Collectively, the components can be assembled on site to form a large, single inlet filter housing.

BACKGROUND

Power generation equipment, such as a gas turbine system, oftentimes must be provided with filtered and conditioned air flow. The equipment for filtering and conditioning an air flow is housed within an inlet filter housing at the upstream end of the power generation equipment. The inlet filter housing encloses the operative structure for the filtering and conditioning and creates a flow path for the air flow. Inlet filter housings are very large structures that vary in size depending on the size of the power generation equipment. For example, they can be 6 meters tall and 20 meters wide, but they can be much larger. The inlet filter housing can also vary widely in axial length depending on the operative structure to be employed therein such as: weather protecting systems, various filter systems, temperature control systems, humidity control systems, monitoring equipment, and flow directing elements such as vanes or transition pieces.

Conventionally, the inlet filter housings are manufactured in parts and transported to a power plant site where they are assembled. The parts are highly segmented and individually do not provide any portion of a complete housing flow path, e.g., a portion of the cross-section or an axial extent of the flow path. Depending on the size and complexity of the inlet filter housing, the number of shipments can be very large, e.g., greater than 25, which can make the transportation of the housing very expensive. In addition, where parts of the inlet filter housing do not fit inside an International Organization of Standards (ISO) shipping container or where they have exceptionally high weight, the complexity of the transportation and the costs can increase significantly. The number of hours to assemble each inlet filter housing is very large, e.g., minimal 1300 hours.

One approach to address the situation employs a number of self-contained inlet filter housings that are each formed from an ISO shipping container and that can be stacked together to collectively provide sufficient air filtering. There are a number of disadvantages of this approach. Notably, because each inlet filter housing is self-contained within its own ISO shipping container, the shipping container creates its own separate but complete flow path. Hence, any large inlet filter housing must include a number of individual filter housings. The segregation between adjacent containers prevents the creation of a single flow path and creates complexity in operating the various filter systems and, more significantly, in maintaining them. For example, changing filters requires accessing each housing separately, which is time consuming and expensive. The need to control a large number of separate filter housings also requires complex changes to current control systems, e.g., to monitor and control a number of small filter housings rather than a single large filter housing.

BRIEF DESCRIPTION

An aspect of the disclosure provides an inlet filter housing, including: a plurality of components that collectively form a complete filtering and conditioning system for filtering and conditioning a fluid along a housing flow path, wherein each component is fitted within an external structure of an International Organization of Standards (ISO) shipping container, which provides a rectangular cuboid enclosure; wherein each component includes operative structure of at least one of: a) only a portion of an axial extent of the filtering and conditioning system, and b) only a portion of a lateral cross-sectional area of the housing flow path.

Another aspect of the disclosure provides a gas turbine (GT) system, including: a turbine section; a combustor operatively coupled to the turbine section; a compressor operatively coupled to the combustor; and an inlet filter housing operatively coupled to the compressor, the inlet filter housing including: a plurality of components that collectively form a complete filtering and conditioning system for filtering and conditioning a fluid along a housing flow path, wherein each component is fitted within an external structure of an International Organization of Standards (ISO) shipping container, which provides a rectangular cuboid enclosure; wherein each component includes operative structure of at least one of: a) only a portion of an axial extent of the filtering and conditioning system, and b) only a portion of a lateral cross-sectional area of the housing flow path.

Another aspect of the disclosure provides a method of forming an inlet filter housing, including: fabricating a plurality of components that collectively form a complete filtering and conditioning system for filtering and conditioning a fluid along a housing flow path, wherein each component is fitted within an external structure of an International Organization of Standards (ISO) shipping container, which provides a rectangular cuboid enclosure; wherein each component includes operative structure of at least one of: a) only a portion of an axial extent of the filtering and conditioning system, and b) only a portion of a lateral cross-sectional area of the housing flow path; transporting the plurality of components to a power plant site; and assembling the plurality of components at the power plant site to form the complete filtering and conditioning system for filtering and conditioning the fluid along the housing flow path.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
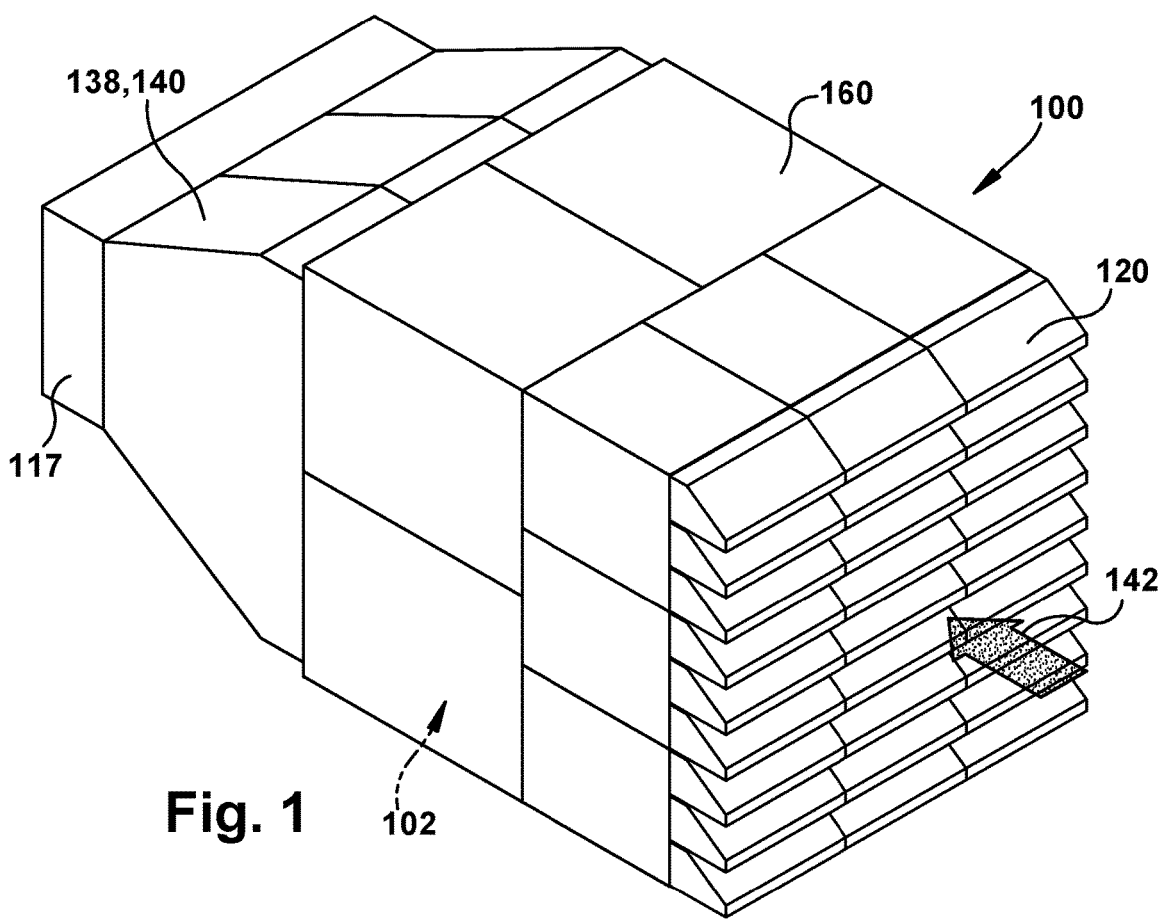
FIG. 1 is a front perspective view of an inlet filter housing, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within an inlet filter housing or gas turbine system. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular part may be referred to using several different or overlapping terms. What may be described herein as being a single part may include and be referenced in another context as consisting of multiple parts. Alternatively, what may be described herein as including multiple parts may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow (i.e., the direction from which the flow originates). The terms "forward" and "aft," without any further specificity, refer to directions, with "forward" referring to the front or intake end of the inlet filter housing, and "aft" referring to the rearward section of the inlet filter housing.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides an inlet filter housing including a plurality of components that collectively form a complete filtering and conditioning system for filtering and conditioning a fluid along a housing flow path. Each component is configured to fit within an external structure of an International Organization of Standards (ISO) shipping container, which provides a rectangular cuboid enclosure. Each component includes operative structure of at least one of: a) only a portion of an axial extent of the filtering and conditioning system, and b) only a portion of a lateral cross-sectional area of the housing flow path. In this fashion, portions of inlet filter housing can be prefabricated and shipped to a final location where they are assembled. In contrast to conventional systems, the components are assembled to create a single inlet filter housing with a single flow path therethrough. The shipping container of each component defines at most only a portion of the outer enclosure of the inlet filter housing, i.e., with no interior walls remaining from the shipping containers segmenting the housing flow path.

Figure 2:
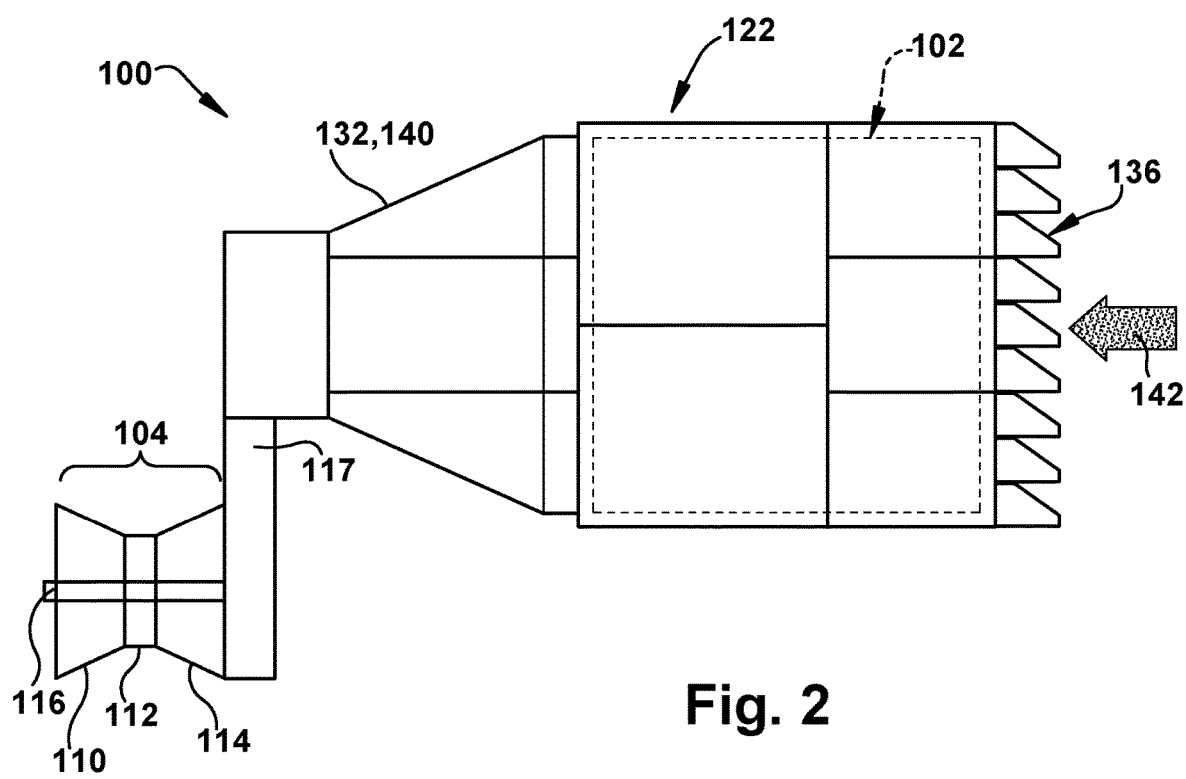
FIG. 2 is a side view of an inlet filter housing, according to embodiments of the disclosure.

FIG. 1 shows a schematic perspective view, and FIG. 2 shows a side view of an illustrative inlet filter housing 100 that can be compartmentalized per embodiments of the disclosure. Inlet filter housing 100 may include any now known or later developed filter and conditioning systems 102 (FIG. 2) for filtering and conditioning a fluid flow, e.g., air, for an industrial application.

For purposes of description, inlet filter housing 100 is shown in FIG. 2 for use with power generating equipment in the form of a gas turbine (GT) system 104. GT system 104 may include any now known or later developed combustion turbine system. In one embodiment, GT system 104 is a typical engine, commercially available from General Electric Company, Greenville, S.C. The present disclosure is not limited to any one particular GT system and may be implanted in connection with other engines including, for example, the other HA, F, B, LM, GT, TM and E-class engine models of General Electric Company, and engine models of other companies. GT system 104 may generally include a turbine section 110, a combustor 112 operatively coupled to turbine section 110, a compressor 114 operatively coupled to combustor 112, and inlet filter housing 100 operatively coupled to compressor 114. Compressor 114 may be operatively coupled to gas turbine 110 through a shared compressor/turbine rotor 116.

In operation, air is drawn by compressor 114 through inlet filter housing 100 where it is filtered and conditioned, prior to being directed from an outlet 117 of inlet filter housing 100 to GT system 100. The compressed air is supplied to combustor 112. Specifically, the compressed air is supplied to a fuel nozzle assembly (not separately labeled) that is integral to combustor 112. The fuel nozzle assembly is also in flow communication with a fuel source (not shown) and channels fuel and air to combustor 112. Combustor 112 ignites and combusts the fuel. Combustor 112 is in flow communication with turbine section 110 through which gas stream thermal energy is converted to mechanical rotational energy. Turbine section 110 is rotatably coupled to and drives rotor 116. Compressor 114 also is rotatably coupled to rotor 116. While inlet filter housing 100 will be described herein for use with power generating equipment, it is emphasized that it has applicability to other industrial applications required filtered and conditioned fluids.

Figure 3:
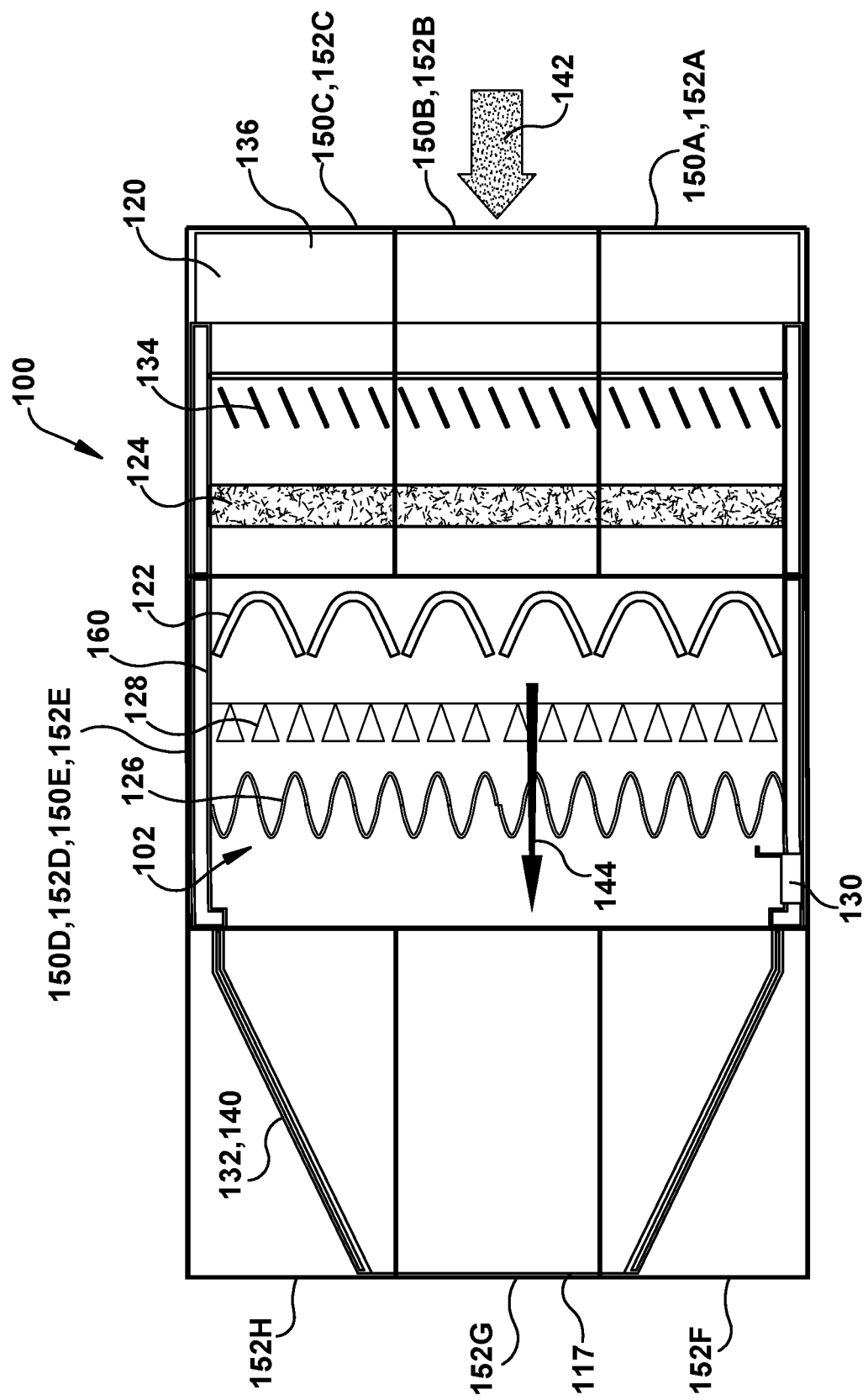
FIG. 3 is a top-down, cross-sectional view of an inlet filter housing, according to embodiments of the disclosure.

FIG. 3 shows a top-down, cross-sectional view of inlet filter housing 100, according to embodiments of the disclosure. Inlet filter housing 100 may include any now known or later developed operative structures for filtering and/or conditioning fluid that passes therethrough. In one embodiment, the fluid is air, but it may include a variety of other fluids, e.g., gases, depending on the application other than a GT system. A non-limiting and non-exhaustive list of operative structures may include one or more of the following: a weather protecting system 120 (e.g., shrouds, covers, etc.), a self-cleaning filter 122, a stacking filter 124, a temperature control system 126 (e.g., heating or cooling coils), a humidity control system 128 (e.g., a fogger with a number of water nozzles, or a dehumidifier), a monitoring system 130, and any variety of flow directing system 132 (e.g., vanes 134 at an upstream end 136 and/or a diverter/transition 138 at a downstream end 140). The operative structures provided and the sizes and shapes thereof may vary based on a number of factors, such as, but not limited to: type of application, size of application (e.g., size of GT system 104), and the environment in which employed. Ancillary structures 148 (FIG. 8) like doors, access platforms/stairs and external supports/mounting features, may also be part of components 150.

Figure 4:
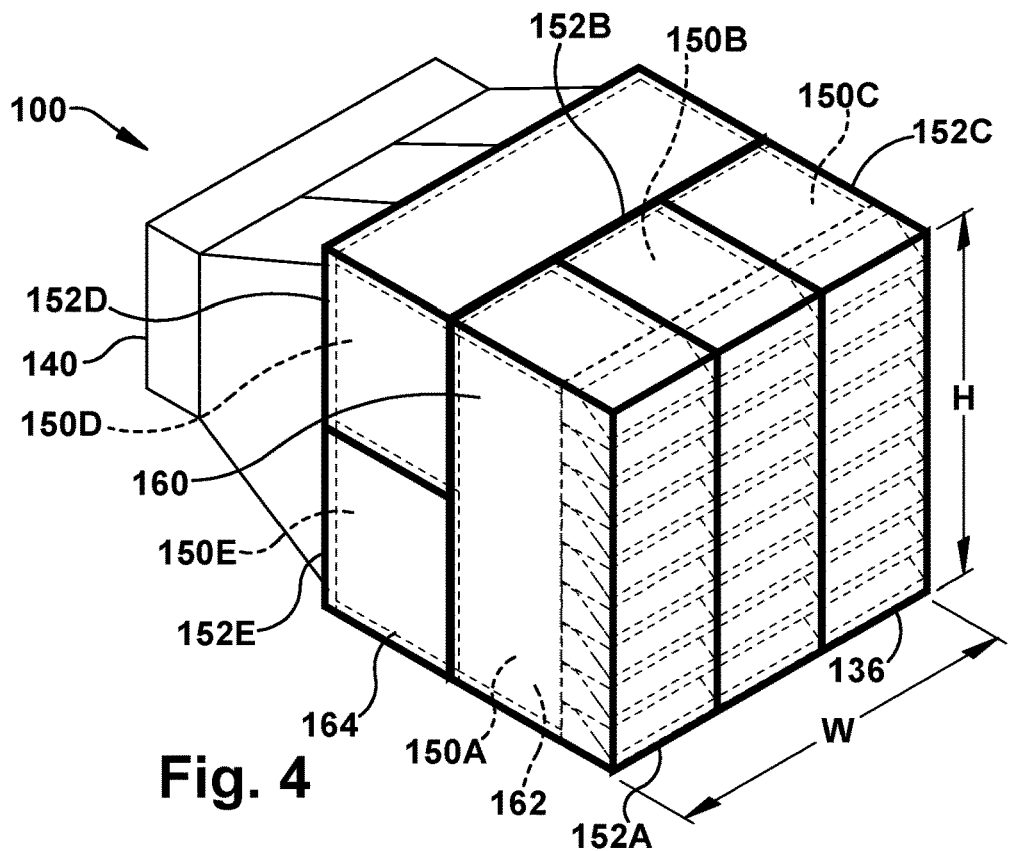
FIG. 4 is a schematic front perspective view of an inlet filter housing compartmentalized into components, according to embodiments of the disclosure.
Figure 5:
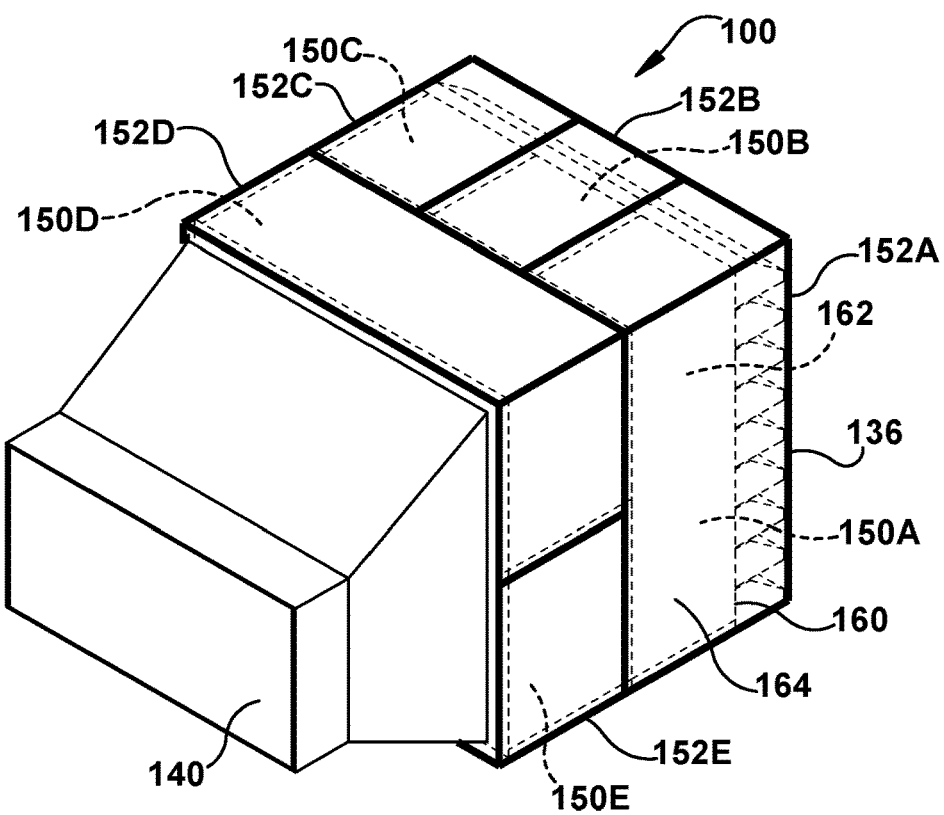
FIG. 5 is a schematic rear perspective view of an inlet filter housing compartmentalized into components, according to embodiments of the disclosure.

FIG. 4 shows a front schematic perspective view of inlet filter housing 100, and FIG. 5 shows a rear schematic perspective view of inlet filter housing 100, according to embodiments of the disclosure. As shown in FIGS. 4-5, in accordance with embodiments of the disclosure, inlet filter housing 100 may be segmented or compartmentalized during fabrication into a plurality of components 150A-E that collectively form a complete filtering and conditioning system 102 (FIGS. 2-3) for filtering and conditioning a fluid 142 along a housing flow path 144 (FIG. 3 only). In the example in FIGS. 4 and 5, five components (compartments) 150A-E are shown. As will be further described, depending on the size of inlet filter housing 100, it may be compartmentalized with more or fewer components 150.

In any event, each component 150 is configured to fit within an external structure of an International Organization of Standards (ISO) shipping container 152, which provides a rectangular cuboid enclosure. ISO shipping container 152 may include any form of large standardized intermodal container, designed and built for intermodal cargo transport. ISO shipping containers 152 are mainly used to transport cargo efficiently and securely in a global containerized intermodal freight transport system. That is, ISO shipping containers 152 can be used across different modes of transport, e.g., from truck to rail to ship, without unloading and reloading the cargo contained therein. ISO shipping containers 152 come in various sizes, but each is configured to ease transportation by standardizing container size, allowing them to be readily handled by handling systems (e.g., cargo cranes) and stacked and/or otherwise secured within a transport mechanism (e.g., trucks, trains, ships, etc.). Illustrative standardized dimensions may be: heights of 8 feet 6 inches (2.6 meters (m)) or 9 feet 6 inches (2.9 m); widths of 8 feet 6 inches (2.6 m) or 9 feet 6 inches (2.9 m); and lengths of twenty or forty feet (6.1 or 12.2 m).

Rather than each ISO shipping container 152 including a complete filter and conditioning system 102, each component 150 includes operative structure of at least one of: a) only a portion of an axial extent of filtering and conditioning system 102, and b) only a portion of a lateral cross-sectional area of housing flow path 144. Housing flow path 144 includes the lateral cross-section (height H and width W) of inlet filter housing 100. Components 150 are fabricated to include the operative structure of: only a portion of an axial extent (part of distance from upstream end 136 to downstream end 140), and/or a portion of a cross-sectional area of housing flow path 144 (part of operative structure in a partial height H and width W of housing flow path 144).

As shown in the example in FIGS. 4 and 5, where the ISO shipping container 152 being used is 8 feet 6 inches by 8 feet 6 inches by twenty feet, an illustrative component 150A may include all of the operative structure that extends just under 8 feet 6 inches (2.6 m) downstream from upstream end 136, just under 8 feet 6 inches (2.6 m) across upstream end 136 from a left side thereof (facing upstream end 136, left to right in FIG. 4) and just under twenty feet (6.1 m) in height. More particularly, as shown best in FIG. 3, component 150A may include upstream end 136, left side portions of: weather protecting system 120 (e.g., shrouds, covers, etc.), vanes 134, and stacking filter 124. In this example, component 150A does not include any of, for example, temperature control system 126, humidity control system 128, and monitoring system 130. Component 150A may also include portions of an outer enclosure 160 of inlet filter housing 100. In the example shown, component 150A includes part of a left side axial extent, a top side corner and a bottom side corner of outer enclosure 160.

In the example shown in FIGS. 3-5, component 150B may include all of the operative structure that extends just under 8 feet 6 inches (2.6 m) downstream from upstream end 136, just under 8 feet 6 inches (2.6 m) across center of upstream end 136 (left to right in FIG. 4) and just under twenty feet (6.1 m) in height. As shown best in FIG. 3, component 150B may include upstream end 136 center portions of: weather protecting system 120, vanes 134, and stacking filter 124. In this example, component 150B does not include any of, for example, temperature control system 126, humidity control system 128, and monitoring system 130. Component 150B may also include portions of outer enclosure 160 of inlet filter housing 100. In the example shown, component 150B includes top side center and a bottom side center of outer enclosure 160 at upstream end 136.

In the example shown in FIGS. 3-5, component 150C may include all of the operative structure that extends just under 8 feet 6 inches (2.6 m) downstream from upstream end 136, just under 8 feet 6 inches (2.6 m) from right side of upstream end 136 (FIG. 4) and just under twenty feet (6.1 m) in height. As shown best in FIG. 3, component 150C may include upstream end 136, right side portions of: weather protecting system 120, vanes 134, and stacking filter 124. In this example, component 150C does not include any of, for example, temperature control system 126, humidity control system 128, and monitoring system 130. Component 150C may also include portions of outer enclosure 160 of inlet filter housing 100. In the example shown, component 150C includes part of a right side axial extent, a top side corner and a bottom side corner of outer enclosure 160.

In the example shown in FIGS. 3-5, lengths of component 150D and 150E extend laterally across inlet housing path 144 rather than vertically, like components 150A-C. Here components 150D, 150E both include axial extents of the operative structure that extends just under 8 feet 6 inches (2.6 m) upstream from downstream end 140, and just under twenty feet (6.1 m) across a width of housing flow path 144. Component 150D includes the operative structures that are just under 8 feet 6 inches (2.6 m) from a top side of housing flow path 144, and component 150E includes the operative structures just under 8 feet 6 inches (2.6 m) from a bottom side of housing flow path 144. As shown best in FIG. 3, component 150D and 150E may include respective, upper and lower side portions of: temperature control system 126, humidity control system 128, monitoring system 130. In this example, components 150D and 150E do not include any of, for example, weather protecting system 120, vanes 134, and stacking filter 124. Components 150D and 150E may also include portions of outer enclosure 160 of inlet filter housing 100. In the example shown, component 150D includes upper parts of the right and left side axial extents and an entire width of a top side of outer enclosure 160, and component 150E includes lower parts of the right and left side axial extents and an entire width of a bottom side of outer enclosure 160.

Figure 6:
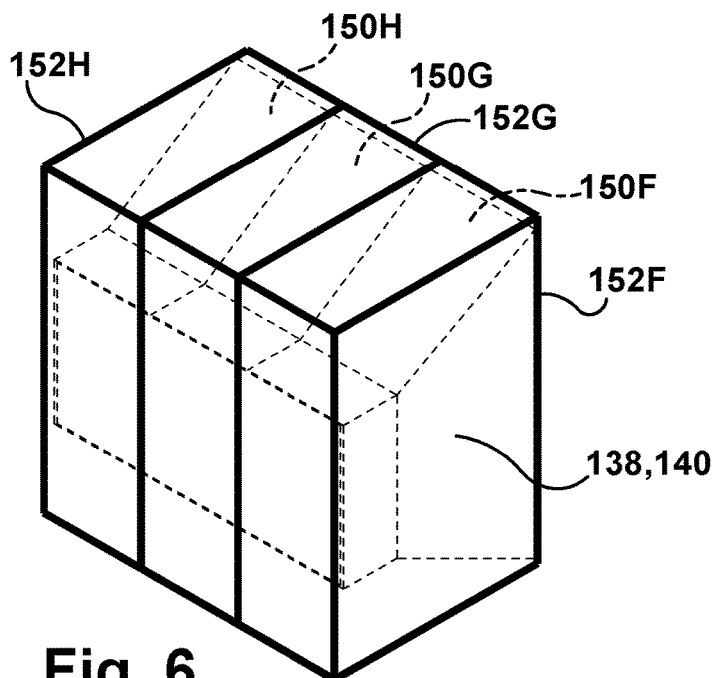
FIG. 6 is a schematic rear perspective view of a transition piece of an inlet filter housing compartmentalized into components, according to embodiments of the disclosure.

FIG. 6 shows a schematic perspective views for three components 150F, 150G, 150H for compartmentalizing transition piece 138 at downstream side 140. Here, three ISO shipping containers 152F, 152G, 152H may be employed, which may be the same or different standardized dimensions as ISO shipping containers 152A-C, e.g., depending on the size of transition piece 138.

As noted, plurality of components 150 collectively define outer enclosure 160 of inlet filter housing 100 that defines housing flow path 144. Consequently, each given component 150 of the plurality of components may define at most only a portion of outer enclosure 160. As shown in FIGS. 4-5, certain components 150 may define a portion of outer enclosure 160. In FIGS. 4 and 5, components 150 include respective portions of outer enclosure 160, e.g., metal walls 162. Here, walls 162 are within and spaced inwardly from a wall 164 of respective ISO shipping container 152.

Figure 7:
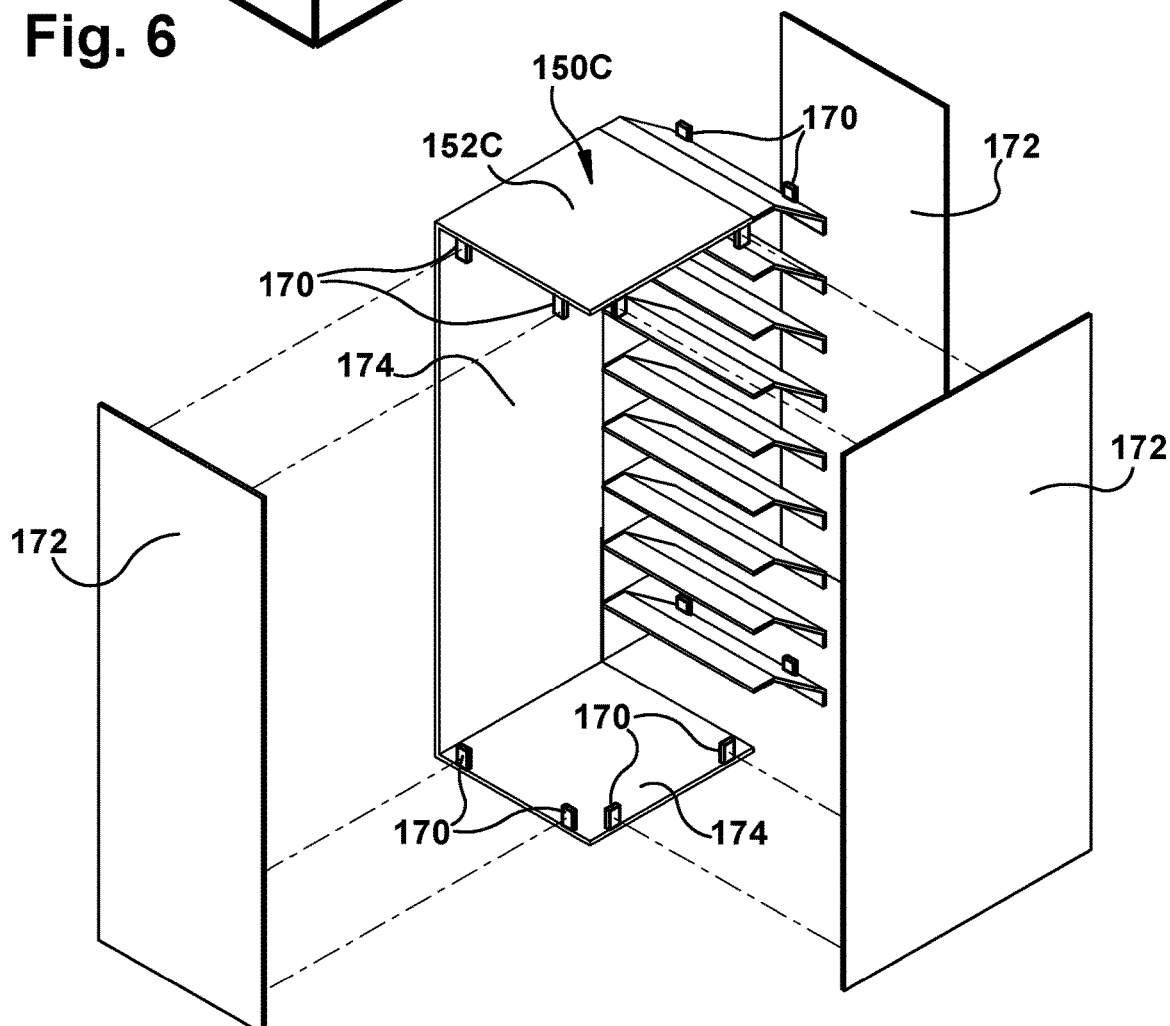
FIG. 7 is a perspective view of a component for an inlet filter housing with wall portions of a shipping container removed, according to embodiments of the disclosure.

Alternatively, as shown in FIG. 7, walls 164 of ISO shipping container(s) 152 of any component 150 may provide respective portions of outer enclosure 160. In this case, for an illustrative component 150C (from FIG. 4), the component may include an enclosure mount 170 to which a wall portion 172 of a respective ISO shipping container 152C is removably coupled. In this manner, remaining wall portions 174 of ISO shipping container 152C may form part of outer enclosure 160 of inlet filter housing 100. In the example shown, remaining wall portions 174 provide a portion of an axial extent, and right side upstream portions of the top and bottom of outer enclosure 160. Removed wall portion(s) 172 may be removed and re-used.

Figure 8:
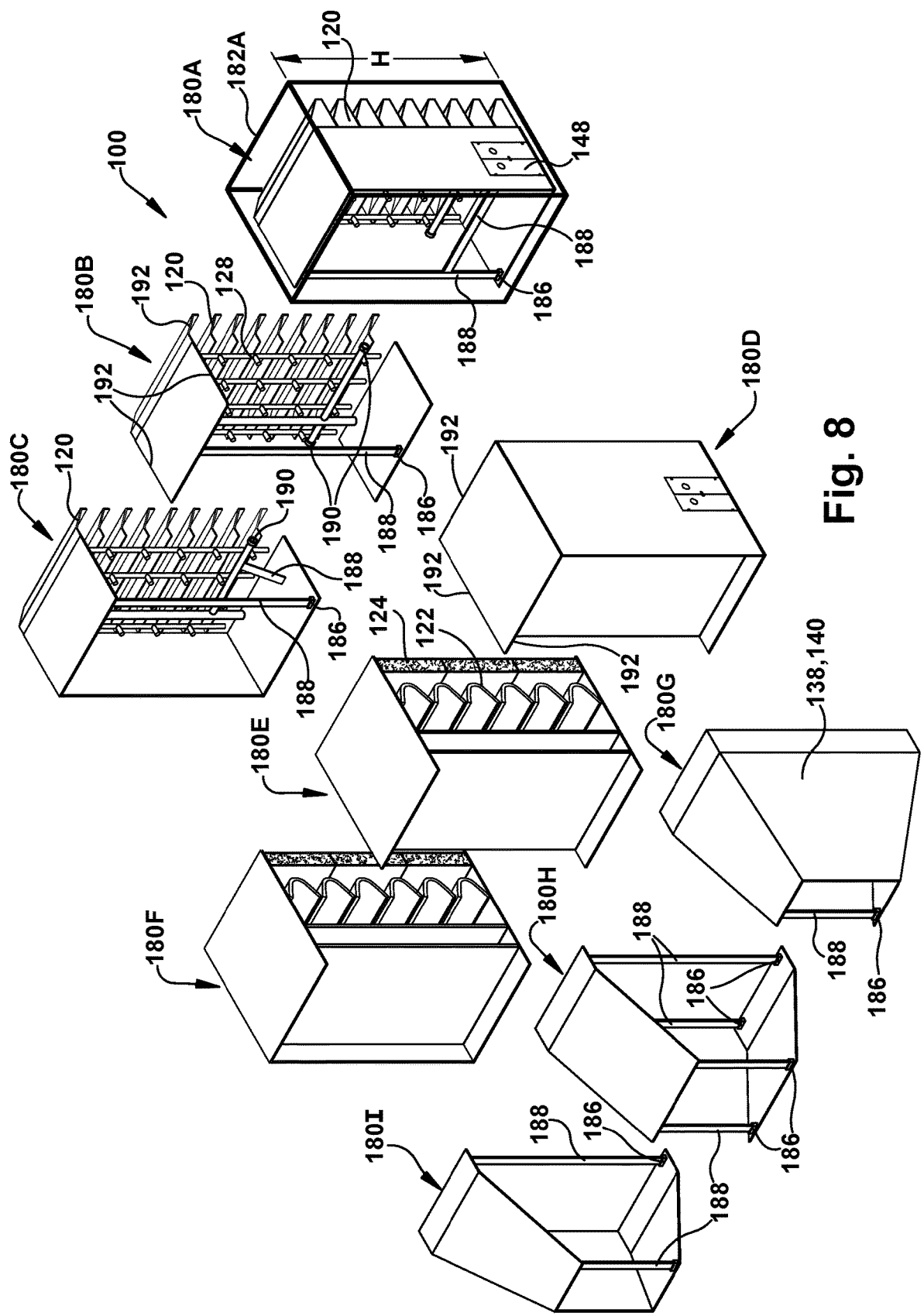
FIG. 8 is an exploded perspective view of an inlet filter housing compartmentalized into components, according to embodiments of the disclosure.

FIG. 8 shows an exploded perspective view of an inlet filter housing 100 compartmentalized in a different manner than previous embodiments. Here, inlet filter housing 100 is compartmentalized into nine (9) components 180A-I, according to another embodiment of the disclosure. Each component 180A-I may be segmented to fit into a respective ISO shipping container 182A (shown only for one component). Here, each component 180 extends an entire height H of inlet filter housing 100 and includes one-third (⅓) of a lateral width of the eventual housing flow path collectively formed by components 180A-I.

FIG. 8 also illustrates that, where necessary, one or more component(s), e.g., 150A-C, 180G-I, may include a support mount 186 to which a transportation support 188 may be removably coupled. Transportation supports 188 may include any structural support member, e.g., an I-beam, that provides support to part of components 180 that may not support themselves at least during transport. For example, transportation supports 188 may support operative structure such as pipes, filter mounts, etc., and/or portions of outer enclosure 160 (shown). Support mounts 186 may include any now known or later developed structure to which transportation supports 188 may be removably coupled, e.g., plates with bolt holes or slots with which to couple transportation supports 188. Support mounts 186 and/or transportation support 188 may be removed during assembly of inlet filter housing 100 at the site of a power plant, or they may remain as part of assembled inlet filter housing 100. While shown as vertically arranged, transportation supports 188 may be configured in any manner to support any desired part of components 150, 180. It is noted that not all components 150, 180 may require transportation supports 188.

Figure 9:
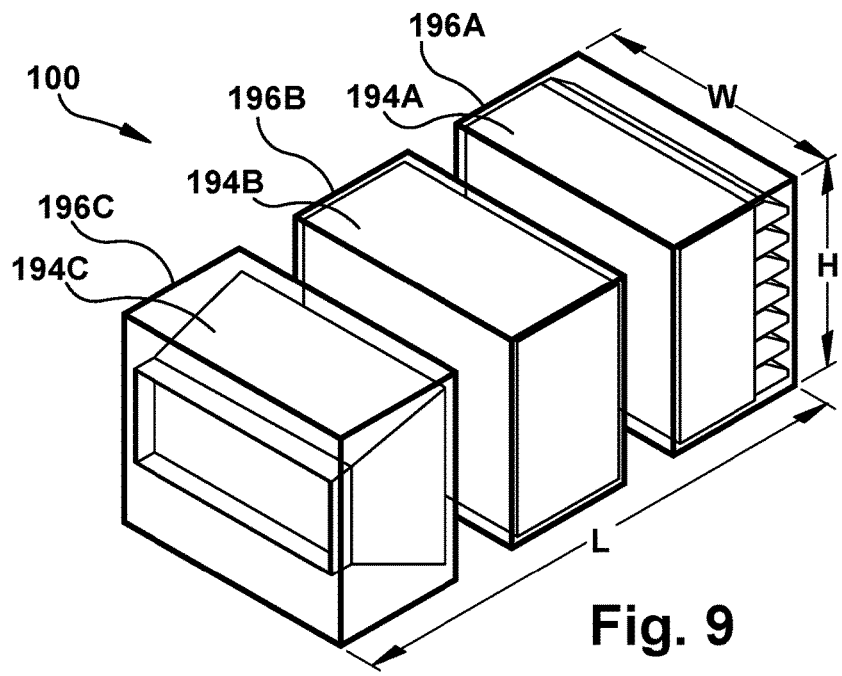
FIG. 9 is an exploded schematic view of an inlet filter housing compartmentalized into components, according to other embodiments of the disclosure.

FIG. 9 shows an exploded schematic view of an inlet filter housing 100 compartmentalized in a different manner than previous embodiments. Here, inlet filter housing 100 is compartmentalized into three (3) components 194A-C, according to another embodiment of the disclosure. Each component 194A-C may be segmented to fit into a respective ISO shipping container 196A-C (shown only for one component). Here, each component 194 extends an entire width W and height H of inlet filter housing 100 and includes one-third (⅓) of length L (axial) of the eventual housing inlet path collectively formed by components 194A-C.

Figure 10:
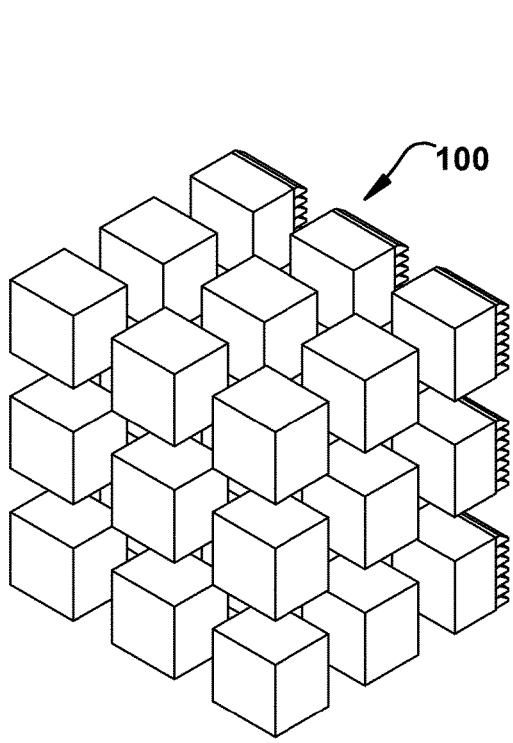
FIG. 10 is an exploded, highly schematic view of an inlet filter housing compartmentalized into components, according to yet other embodiments of the disclosure.
Figure 11:
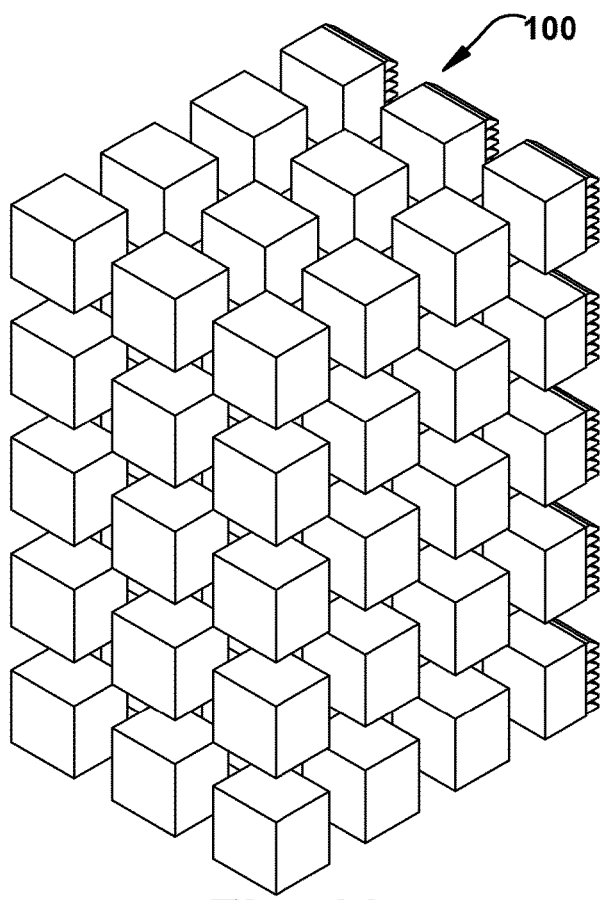
FIG. 11 is an exploded, highly schematic view of an inlet filter housing compartmentalized into components, according to yet other embodiments of the disclosure.

FIGS. 10 and 11 show exploded, highly schematic views of other arrangements of compartmentalized inlet filter housing 100. Any number of components in any number of rows and/or columns may be employed according to embodiments of the disclosure.

Each component may include any necessary mechanisms for operatively coupling the component to one or more adjacent components. For example, for a humidity control system 128 that injects water into fluid flow 142, pipe couplings 190 (FIG. 8) may be used to couple pipes within adjacent components. In another example shown in FIG. 8, any necessary seals 192, e.g., for portions of outer enclosure 160 in adjacent components, may be provided with one or more components. In another example, additional wiring lengths, e.g., wires and/or conduit, may be provided in selected components for coupling to wiring in an adjacent component. The assembled inlet filter housing 100 may thus include the necessary mechanisms to operatively couple adjacent components along joining areas of the adjacent components that would not normally be present in a conventional inlet filter housing.

A method of forming inlet filter housing 100 according to embodiments of the disclosure may include fabricating a plurality of components that collectively form a complete filtering and conditioning system 102 for filtering and conditioning a fluid 142 along a housing flow path 144. As noted, each component (e.g., 150, 180, 194) is configured to fit within an external structure of ISO shipping container (e.g., 152, 182, 196) which provides a rectangular cuboid enclosure. Each component includes operative structure of at least one of: a) only a portion of an axial extent of filtering and conditioning system 102, and b) only a portion of a lateral cross-sectional area of housing flow path 144.

The components may be transported to a power plant site and may be assembled at the power plant site to form the complete filtering and conditioning system 102 (FIG. 3) for filtering and conditioning fluid 142 along housing flow path 144. Prior to the assembling, a portion of a respective ISO shipping container 152, 182 may be removed from enclosure mount 170 (FIG. 7) on a respective component 150, 180 to which the portion of a respective ISO shipping container 152, 182 is coupled. As shown in FIG. 8, as necessary, component(s) 180 may include support mount(s) 186 to which transportation support 188 is removably coupled. Transportation support(s) 188 may be removed prior to the assembling of components 180. As noted, the plurality of components collectively defines outer enclosure 160 of inlet filter housing 100 that defines housing flow path 144 (FIG. 4). ISO shipping container 152, 182, 196 of each component 150, 180, 194, respectively, defines at most only a portion of outer enclosure 160. As shown in FIGS. 1-2, the assembling also includes coupling the complete inlet filter housing 100 to power generation equipment such as GT system 104.

Embodiments of the disclosure provide an inlet filter housing including a plurality of components that collectively form a complete filtering and conditioning system for filtering and conditioning a fluid along a housing flow path. The components can be transported in ISO shipping containers, reducing the number of shipments and consequently the costs and complexity of transport. The reduced number of parts that must be connected together to assemble inlet filter housing 100 saves time and money. In addition, the shipping container can define portions of the outer enclosure of the inlet filter housing (i.e., with no interior walls remaining from the shipping containers segmenting the housing flow path) that eases the time of assembly. In some cases, the assembly time of inlet filter housing 100 can be reduced by greater than 800 hours. In contrast to conventional systems, the components are assembled to create a single inlet filter housing with a single flow path therethrough. Consequently, conventional control systems may still be employed. The pre-fabrication at a manufacturing site also allows for increased quality control with less reliability on on-site labor and overall reduces production costs.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. An inlet filter housing, comprising:
a plurality of components that are each disposed within a respective external structure of a respective International Organization of Standards (ISO) shipping container and that collectively form, in an assembled position, a single filtering and conditioning system for filtering and conditioning a fluid along a housing flow path defined by an outer enclosure of the inlet filter housing, the housing flow path extending from an upstream end of the inlet filter housing that is in fluid communication with ambient atmosphere, to a downstream end of the inlet filter housing configured, in the assembled position, for connection to an inlet of a gas turbine engine;
wherein each component of the plurality of components includes at least one permanent outer wall that forms a portion of the outer enclosure in the assembled position, the outer enclosure thereby including a contiguous wall formed by the at least one permanent outer walls of the plurality of components, each component of the plurality of components further including at least two removable walls that are removed in the assembled position to eliminate internal walls from the housing flow path, and wherein a downstream end of one component of the plurality of components is connected to a respective upstream end of another component of the plurality of components that is directly downstream of the one component of the plurality of components.

2. The inlet filter housing of claim 1, wherein the plurality of components includes at least one first component including a weather protection device, vanes downstream of the weather protection device, and first filtration media downstream of the vanes.

3. The inlet filter housing of claim 2, wherein the weather protection device includes at least one of a shroud, a cover, and a door.

4. The inlet filter housing of claim 2, wherein, in the assembled position, an upstream end of the at least one first component is disposed at the upstream end of the inlet filter housing, the at least one first component thereby defining a first portion of the housing flow path in the assembled position, the first portion of the housing flow path extending from the upstream end of the at least one first component to the downstream end of the at least one first component.

5. The inlet filter housing of claim 4, wherein the plurality of components includes at least one second component including an upstream end connected to a downstream end of the at least one first component in the assembled position, and the at least one second component forms a second portion of the housing flow path extending from the upstream end of the at least one second component to a downstream end of the at least one second component in the assembled position.

6. The inlet filter housing of claim 5, wherein the at least one second component includes a first flow transition element disposed in the at least one second component, the first flow transition element extending from the upstream end of the at least one second component to the downstream end of the at least one second component, wherein an upstream end of the first flow transition element in the assembled position has a larger surface area than a downstream end of the first flow transition element.

7. The inlet filter housing of claim 5, wherein the at least one second component includes a second filtration media at an upstream end thereof.

8. The inlet filter housing of claim 7, wherein the at least one second component includes an environmental control system downstream of the second filtration media.

9. A gas turbine system, comprising:
a turbine section;
a combustor operatively coupled to the turbine section;
a compressor operatively coupled to the combustor; and
an inlet filter housing operatively coupled to the compressor, the inlet filter housing including:
an outer enclosure in which a plurality of components of the inlet filter housing are disposed, wherein each of the plurality of components is disposed within a respective external structure of a respective International Organization of Standards (ISO) shipping container, and wherein each of the plurality of components includes at least one permanent outer wall that forms a portion of the outer enclosure;
an upstream end through which fluid selectively enters the inlet filter housing;
a downstream end in fluid communication with the upstream end and through which fluid exits the inlet filter housing during operation;
a housing flow path defined by the outer enclosure and extending from the upstream end to the downstream end, wherein each of the plurality of components includes at least two removable walls that are removed in an assembled position to eliminate internal walls from the housing flow path, and wherein an axial extent of the housing flow path is defined in part by a first of the plurality of components and a second of the plurality of components that is directly downstream of the first of the plurality of components, a downstream end of the first of the plurality of components being directly connected to an upstream end of the second of the plurality of components;
a filtering system disposed in the plurality of components; and
a conditioning system disposed in the plurality of components.

10. The gas turbine system of claim 9, wherein at least two of the plurality of components are required to form the complete inlet filter housing.

11. The gas turbine system of claim 9, wherein at least one system of the inlet filter housing requires parts of at least two components of the plurality of components for the at least one system to be complete.

12. The gas turbine system of claim 9, wherein each component of the plurality of components includes operative structure of at least one of: a) only a portion of an axial extent of the filtering system, b) only a portion of an axial extent of the conditioning system, and c) only a portion of a lateral cross-sectional area of the housing flow path.

13. The gas turbine system of claim 9, wherein the respective ISO shipping container of each component of the plurality of components defines at most only a portion of the outer enclosure.

14. The gas turbine system of claim 9, wherein each component of the plurality of components includes an enclosure mount to which a portion of a respective ISO shipping container is removably coupled.

15. The gas turbine system of claim 9, wherein at least one component of the plurality of components includes a support mount to which a transportation support is removably coupled.

16. The gas turbine system of claim 9, wherein the fluid flow is directed from an outlet of the inlet filter housing to at least one of the compressor, the combustor, and the turbine section.

17. The gas turbine system of claim 9, wherein the filtering system and the conditioning system each have parts in at least two components of the plurality of components.

18. The gas turbine system of claim 9, wherein every system of the inlet filter housing requires parts in at least two components of the plurality of components.

19. An inlet filter housing, comprising:
a plurality of components that are each disposed within a respective external structure of a respective International Organization of Standards (ISO) shipping container and that collectively form, in an assembled position, a single filtering and conditioning system for filtering and conditioning a fluid along a housing flow path defined by an outer enclosure of the inlet filter housing, the housing flow path extending from an upstream end of the inlet filter housing that is in fluid communication with ambient atmosphere to a downstream end of the inlet filter housing,
wherein each component of the plurality of components includes at least one permanent outer wall that forms a portion of the outer enclosure, each component of the plurality of components further including at least two removable walls that are removed in the assembled position to eliminate internal walls from the housing flow path, wherein the plurality of components includes at least one first component including a weather protection device, vanes downstream of the weather protection device, and first filtration media downstream of the vanes, wherein, in the assembled position, an upstream end of the at least one first component is disposed at the upstream end of the inlet filter housing, the at least one first component thereby defining a first portion of the housing flow path in the assembled position, the first portion of the housing flow path extending from the upstream end of the at least one first component to the downstream end of the at least one first component, and wherein the plurality of components includes at least one second component including an upstream end connected to the downstream end of the at least one first component in the assembled position, and the at least one second component forms a second portion of the housing flow path extending from the upstream end of the at least one second component to a downstream end of the at least one second component in the assembled position.

* * * * *